United States Patent [19]

Naugle et al.

[11] Patent Number: 5,353,501
[45] Date of Patent: Oct. 11, 1994

[54] METHOD OF MANUFACTURING VARIABLE ORIFICE DEVICES

[75] Inventors: Robert A. Naugle, Scottsville; Philip E. Stoneham; John R. Tinney, both of Rochester, all of N.Y.

[73] Assignee: Eastman Kodak Company, Rochester, N.Y.

[21] Appl. No.: 878,193

[22] Filed: May 4, 1992

Related U.S. Application Data

[62] Division of Ser. No. 629,788, Dec. 19, 1990, Pat. No. 5,141,029.

[51] Int. Cl.$^5$ .............................................. B23P 15/00
[52] U.S. Cl. ................... 29/840.126; 29/449; 29/890.124; 138/44
[58] Field of Search ............... 29/890.126, 890.124, 29/446, 449; 138/40, 44, 45, 46

[56] References Cited

U.S. PATENT DOCUMENTS

| | | | |
|---|---|---|---|
| 818,938 | 4/1906 | Crane | 239/533.13 |
| 1,910,032 | 5/1933 | Mills | 222/490 |
| 2,147,165 | 2/1939 | Kent | 221/60 |
| 2,679,954 | 6/1954 | Barnes | 222/490 |
| 3,174,694 | 3/1965 | Kitabayashi | 239/573 |
| 3,428,223 | 2/1969 | Lewiecki et al. | 222/398 |
| 3,491,791 | 1/1970 | Polk | 29/890.12 C |
| 3,674,183 | 4/1972 | Venable et al. | 222/212 |
| 3,696,958 | 10/1972 | Lee | 138/45 |
| 3,899,135 | 8/1975 | O'Brian | 239/534 |
| 4,003,398 | 1/1977 | Duveau | 137/512 |
| 4,193,552 | 3/1980 | Ishikawa | 239/533.13 |
| 4,356,935 | 11/1982 | Kamin | 222/1 |
| 4,620,648 | 11/1986 | Schwartzman | 222/490 |
| 4,627,573 | 12/1986 | Havens et al. | 239/542 |
| 4,646,945 | 3/1987 | Steiner et al. | 137/845 |
| 4,869,431 | 9/1989 | Jubert et al. | 239/533.13 |
| 4,871,093 | 10/1989 | Burshtain et al. | 222/213 |
| 4,938,259 | 7/1990 | Schmidt | 138/45 |
| 4,989,456 | 2/1991 | Stupecky | 73/863.53 |

FOREIGN PATENT DOCUMENTS

| | | | |
|---|---|---|---|
| 207642 | 2/1960 | Fed. Rep. of Germany | 138/44 |
| 1201139 | 9/1965 | Fed. Rep. of Germany | |
| 61376 | 4/1955 | France | 138/45 |
| 1235982 | 6/1960 | France | |
| 1300914 | 7/1962 | France | |
| 2013821 | 8/1979 | United Kingdom | |

*Primary Examiner*—Irene Cuda
*Attorney, Agent, or Firm*—Carl F. Ruoff

[57] ABSTRACT

A variable orifice device for passing fluent material under pressure includes a piece of resilient material bent out of its normal shape so that one surface is in tensile stressed condition and the other surface is in compressive stressed condition. A slit extends between the two surfaces. Because of the difference in the stressed conditions of the two surfaces, one end of the slit is open and the other end, at the compressively stressed surface, is in forced closed condition. The piece of resilient material is mounted in its bent, stressed condition in a frame which holds the material in the bent condition. The piece of resilient material may be cut from silicone rubber tubing such as is used for peristaltic pumps. The frame may be two annular members, one of which is a push fit in the other, with the other having an annular shoulder against which a disc of the resilient material is trapped and sealed by the one annular member.

3 Claims, 2 Drawing Sheets

METHOD OF MANUFACTURING VARIABLE ORIFICE DEVICES

This is a divisional of application Ser. NO. 629,788, filed Dec. 19, 1990, now U.S. Pat. No. 5,141,029.

BACKGROUND OF THE INVENTION

1. Field of the Invention

This invention relates to variable orifice devices for controlling the flow of fluent material and which are opened to allow flow by a change in pressure differential across the device.

SUMMARY OF THE INVENTION

It is an object of the invention to provide a variable orifice device which is simple and economic in construction so that it is discardable, which inhibits leakage in the reverse direction, and which allows a wide range of flow rates with little variation in back pressure.

The objects are achieved in accordance with the present invention by providing an element formed of resilient material having opposed surfaces and a finite thickness between those surfaces. The element has a slit extending through its thickness between those surfaces. One end of the slit is at one of the surfaces and the other end of the slit is at the other of the surfaces. The thickness of the element is such that when said element is deformed by bending out of an unstressed condition, said one surface is subjected to tensile stresses and said other surface is subjected to compressive stresses whereby said one end of the slit opens and the other end of the slit is forced closed. The device also includes means for mounting the element in a bent, stressed condition whereby the said other end of the slit is forced closed.

In one embodiment of the invention the element is formed from a piece of cylindrical tube of resilient material, such as, silicone rubber. A slit is made in the tube piece parallel to the axis of the tube piece. The tube piece is then cut along its length parallel to the axis diametrically opposite the slit. The cut piece of material is developed and laid out flat. A disc is cut out of the material with the circular shape of the disc centered on the middle of the length of the slit. The disc-shaped piece of material, having the slit, is then mounted in the mounting means.

In one embodiment, the mounting means includes a first annular member having an annular shoulder. The disc-shaped piece of resilient material, which has the slit, is placed in the annular member against the annular shoulder and a second annular member, which is a push fit in the first, is pushed into the first annular member so as to trap the disc-shaped element and retain it in stressed condition

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENT

Figure 1:
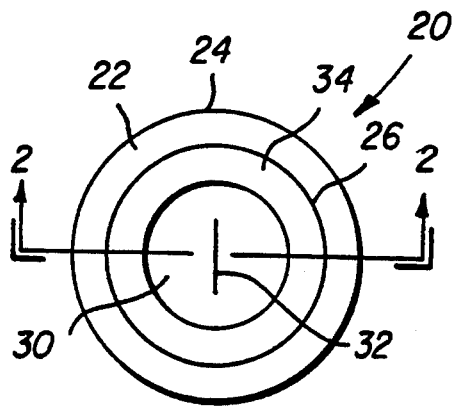
FIG. 1 is a plan view of a variable orifice device in accordance with the present invention.
Figure 2:
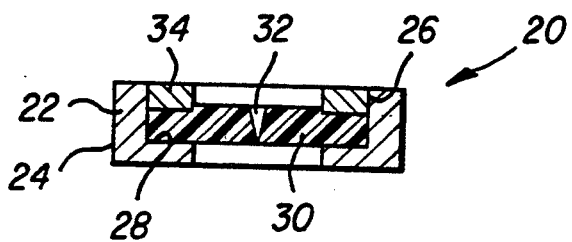
FIG. 2 is a cross-sectional view taken on the line II—II in FIG. 1.

In FIGS. 1 and 2 there is illustrated a variable orifice device 20 in accordance with the present invention. The device 20 includes a first rigid frame member in the form of an annular member 22 which has an external cylindrical surface 24, an internal cylindrical surface 26 and an annular shoulder 28 facing over the surface 26. Seated on the shoulder 28 is a disc 30 of silicone rubber material. The disc 30 has a diameter such that its periphery contacts the internal cylindrical surface 26 of the first annular member 22. The disc 30 has a slit 32 and will be described in greater detail. The disc 30 is secured in the first annular member 22 by a second rigid frame member in the form of an annular member 34 which has such an external diameter that it is a push fit into the first annular member 22 and is retained therein by the interference fit between the two annular members. The second annular member 34 is pushed into the first annular member 22 so far that the peripheral annular margin of the disc 30 is compressed slightly so that there is no path for leak of fluent material, to be controlled by the variable orifice device, between the first and second annular members and the disc 30.

Figure 3:
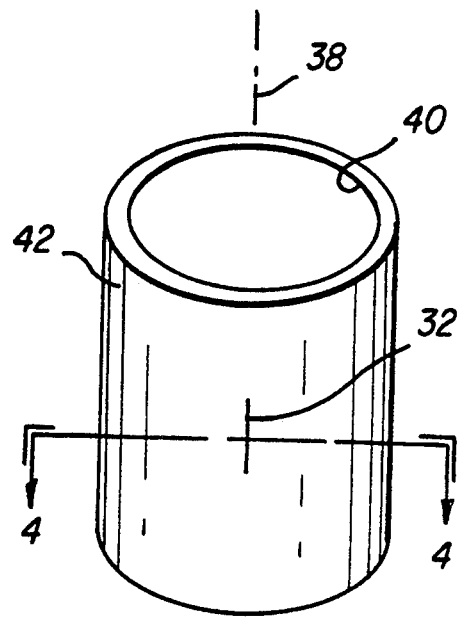
FIG. 3 is a perspective view of a piece of silicone rubber tube, it being the starting material for a component of the variable orifice device illustrated in FIGS. 1 and 2.

The disc 30 is formed from a tube formed of silicone rubber. FIG. 3 illustrates a piece 36 of silicon rubber tube. A suitable tube is that made for use in peristaltic pumps and in the present embodiment it was marketed by Masterflex with stock numbers ranging from #N-06411-13 through #N-06411-24, depending on diameter and wall thickness. In the present embodiment the tube has a 0.434 inch outside diameter and a wall thickness of 0.058 inch and has an inner surface 40 and an outer surface 42. To form the disc 30 from the tube piece 36 the slit 32 is made in the piece 36. The slit is parallel to the axis 38 of the tube piece 36 and is 0.125 inch long. The slit extends between the inner surface 40 and the outer surface 42.

Figure 4:
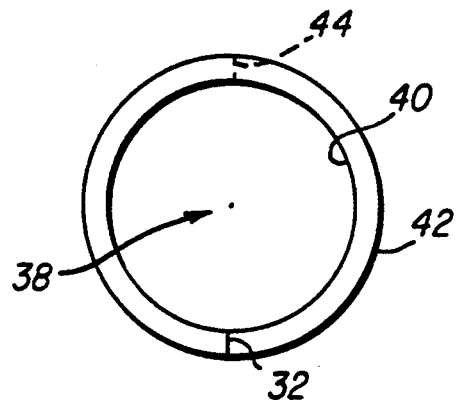
FIG. 4 is a cross-section on the line IV—IV in FIG. 3.
Figure 5:
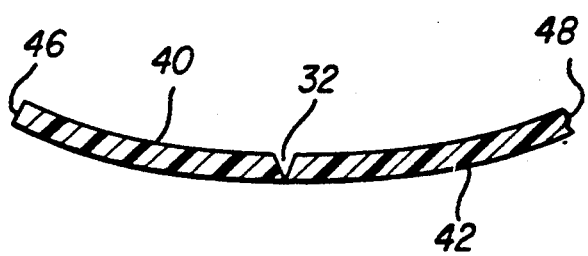
FIG. 5 is a view similar to that of FIG. 4 but after a further manufacturing operation has been conducted.

After the slit 32 has been made in the tube piece 36, the tube piece is cut throughout its length along a line 44 (see FIG. 4) parallel to the axis 38 and diametrically opposite the slit 32. The cut along line 44 creates two edges 46 and 48 and allows the tube piece 36 to be developed out of its cylindrical form shown in FIGS. 3 and 4, through the partially developed form shown in FIG. 5, into a planar condition. It will be recognized that as the tube piece 36 is being developed from the cylindrical form towards the planar condition, the surface 40 is being stressed in tension, progressively, and the surface 42 is being stressed in compression, progressively. The creation of such stresses has the effect of opening the slit 36 at the surface 40 and of forcing the bounding walls of the slit together adjacent the surface 42, as can be seen in FIG. 5.

The next manufacturing stage is to make a circular cut in the silicon rubber material so as to form the disc 30. The circular shape of the cut is centered on the middle of the length of the slit 32 and has a diameter equal to that of the internal cylindrical surface 26 of the first annular member 22.

To assemble the variable orifice device, the disc 30 is inserted in planar form into the first annular member 22 and then the second annular member 34 is pushed into the first annular member 22 to trap the disc 30. The interference fit between the two annular members retains the assemble of the two annular members and the disc, together.

In use, the variable orifice device is mounted so that the open end of the slit 32 faces the fluent material which is to be passed by the device. In this way, when the pressure is increased in the fluent material to cause passage of the material through the device, the increased pressure differential on the two surfaces of the disc 30 tends to cause the disc to move back towards its unstressed condition and in this way the forces keeping the slit closed at the surface 42 are overcome and the device is caused to pass fluent material. In all embodiments of the present invention, the variable orifice device is mounted so that the direction of flow through the slit is from the surface which is in tension to the surface which is in compression.

Figure 8:
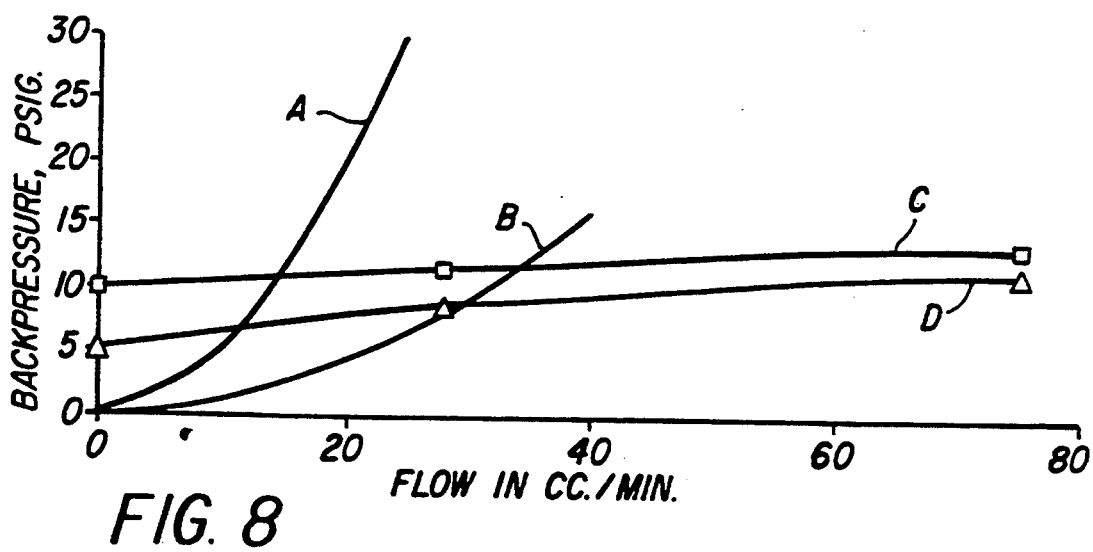
FIG. 8 is a plot of pressure drop against flow rates for two variable orifice devices in accordance with the present invention and for two fixed diameter open hole orifices for comparison.

It has been found that a variable orifice device as described above provides a more nearly uniform pressure drop over a very wide range of flow rates than does a fixed diameter open hole orifice. Reference is made to FIG. 8 which is a plot of pressure drop in PSIG against flow in cc/min for: a fixed orifice having a diameter of 0.010 inch diameter (plot A); a fixed orifice having a diameter of 0.004 inch diameter (plot B); a first variable orifice device in accordance with the present invention, as described above (plot C); and a second variable orifice device in accordance with the present invention, as described above (plot D). It will be observed that the devices in accordance with the present invention provide a backpressure which is more nearly uniform throughout a wide range of flow rates. Expressed another way, devices in accordance with the present invention may provide a wide range of flow rates with only a small variation in pressure to cause flow. The first variable orifice, from which the plot C is derived, had a shorter slit than the device of plot D and it is the shorter slit which caused the higher cracking and operating pressure. Both the devices of plots C and D had other dimensions as described above.

Figure 7:
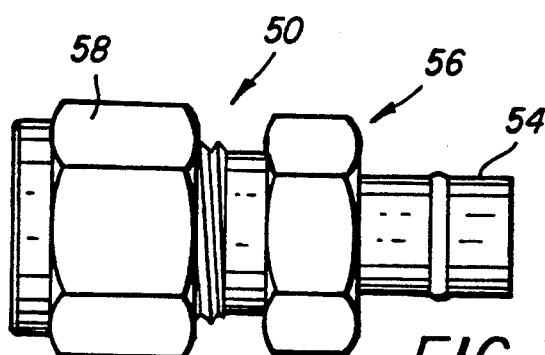
FIG. 7 is a side elevational view of the housing illustrated in FIG. 6.

FIG. 7 illustrates a well known plumbing fitting 50, formed of brass, which has been internally modified to form a housing for the variable orifice device described above. The plumbing fitting 50 is a coupling for coupling two pipes one of which is to be connected to one component 52 of the coupling by a compression connection. In this usage of the coupling 50 the compression rings are discarded. The coupling has a stub pipe 54, which is an integral part of the other component 56 of the coupling, which is intended to be connected by a union to the other pipe.

Figure 6:
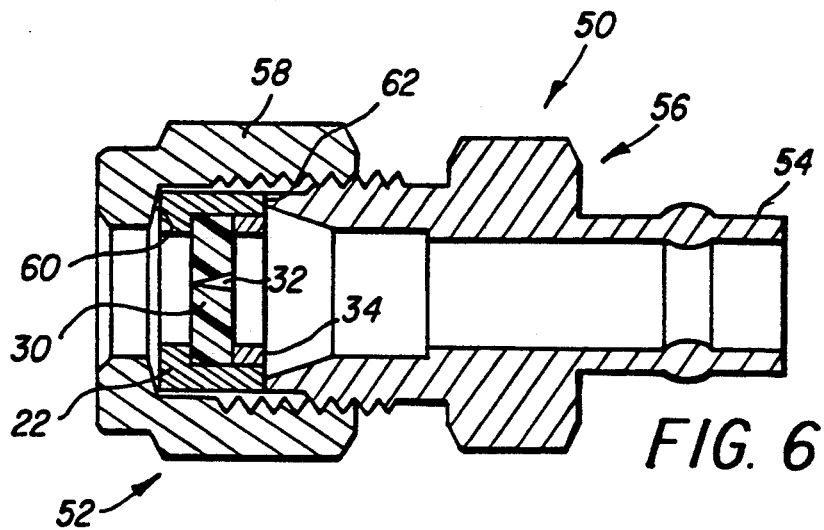
FIG. 6 is a cross-sectional view of a housing containing a variable orifice device as illustrated in FIGS. 1 and 2.

The one component 52 of the fitting 50 includes a cup nut 58 threadedly engaged with the other component 56. The cup nut 58 has a frusto-conical surface 60 facing, but spaced from, an annular end surface 62 of the other component 56. In the present use of the fitting 50 the device 20 is positioned where the compression rings would have been if the fitting were being used for its designed purpose, as may be seen in FIG. 6. The device 20 is positioned and the cup nut 58 is tightened up on the other component 56 thereby securing it in place and creating a seal preventing fluent material flowing through the fitting 50 other than through the slit 32.

In use the stub pipe 54 is connected to a supply pipe. The fitting 50 constitutes a housing for the device 20. The device may be used in the above-described housing as the end of a feed pipe for adding additives to a mixing vat. It has been found that the valve is very effective at preventing backflow from the vat into the additive feed pipe and that the volume of additive added may be very accurately controlled, there being no dripping or other drainage out of the feed pipe after the measured volume has been ejected through the valve.

It has been found that the cracking pressure, that is, the threshold pressure necessary to cause the valve to open and allow flow of fluent material through it, and, hence, also the operating pressure, may be selected by selection of the wall thickness of the tube piece 36, the selection of the diameter of the tube piece 36 and the length of the slit 32. Each of thickening the tube wall, reducing the diameter of the tube and shortening the length of the slit, will increase the cracking pressure and the operating pressure.

Figure 9:
FIG. 9 is a scrap cross-sectional view, similar to that of FIG. 2, but lacking the mounting means.

It has been found that the flow rate of a valve as described may be increased by forming the slit with an oblique incision instead of one perpendicular to the surfaces. Such an incision is illustrated at 64 in FIG. 9.

While the invention has been described above in an embodiment in which the starting material for the valve element formed of resilient material was a piece of tube and the valve element was stressed in planar form in use, it is to be understood that both the starting material and the form of it in use may be different to those forms described above. For example, the starting material may be a planar sheet of resilient material, such as silicone rubber, and it may be deformed into cylindrical shape in use. Also, the starting material could be spherical with it being stressed into larger or smaller radius in use. Furthermore, while it in the embodiment of the invention particularly described above the slit is formed in the starting material before it is bent into its stressed condition, the slit could be formed when the material is in the stressed or a partially stressed condition.

Also, it should be understood that while in the embodiment specifically described above and illustrated in the drawings, the disc 30 is in planar shape, in use, in other embodiments it may be in cylindrical shape of greater or less diameter than that of the tube from which it was formed.

While in the embodiment specifically described above the element formed of resilient material, which performs the actual flow control, in use, is in the form of a disc, when stressed, it is to be understood that a circular peripheral form in either the stressed or unstressed condition is not an essential feature of the invention. For example the periphery could be rectangular.

The invention has been described in detail with particular reference to a presently preferred embodiment, but it will be understood that variations and modifications can be effected within the spirit and scope of the invention.

What we claim is:

1. A method of manufacturing a variable orifice device comprising:

providing a piece of resilient material, the piece of resilient material having opposed first and second surfaces and a finite thickness between the first and second surfaces and having a first unstressed position wherein the first surface is concave and the second surface is convex and having a second stressed position wherein the first and second surfaces are planar so that the first surface is subjected to tensile stresses and the second surface is subject to compressive stresses;

forming a slit in the piece of resilient with one end of the slit being at the first surface and the other end of the slit being at the second surface; and mounting the piece of material in the second position whereby said one end of the slit opens and said other end of slit is forced closed.

2. A method as claimed in claim 1, wherein:

the step of forming the slit is performed while the piece of material is in an unstressed condition.

3. A method as claimed in claim 1, wherein the step of mounting the piece of material in the second position is performed by providing first and second frame embers and mounting the piece of material between the frame members.

* * * * *